T. MILLER & C. A. SEARGENT.
COMBINED RAKE AND PITCHFORK.
APPLICATION FILED APR. 28, 1915.

1,185,426.

Patented May 30, 1916.

UNITED STATES PATENT OFFICE.

THEODORE MILLER AND CLAYTON A. SEARGENT, OF GRAFTON, WEST VIRGINIA.

COMBINED RAKE AND PITCHFORK.

1,185,426.

Specification of Letters Patent.

Patented May 30, 1916.

Application filed April 28, 1915. Serial No. 24,531.

*To all whom it may concern:*

Be it known that we, THEODORE MILLER and CLAYTON A. SEARGENT, citizens of the United States, residing at Grafton, in the county of Taylor and State of West Virginia, have invented certain new and useful Improvements in Combined Rakes and Pitchforks; and we do hereby declare the following to be a full, clear, and exact description of the invention, such as will enable others skilled in the art to which it appertains to make and use the same.

This invention relates to combined rakes and pitch-forks, and one of the principal objects of the invention is to provide a simple implement which can be quickly converted from a rake into a pitch-fork so that the materials raked up can be readily pitched onto a wagon or into a pile.

Another object of the invention is to provide a combined rake and pitch-fork having a rake head perforated to permit the extension of the fork tines, and the head of the fork being provided with a spring clasp or latch which will hold the head in two positions, both extended and retracted.

The foregoing and other objects may be attained by means of the construction illustrated in the accompanying drawing, in which—

Figure 1:
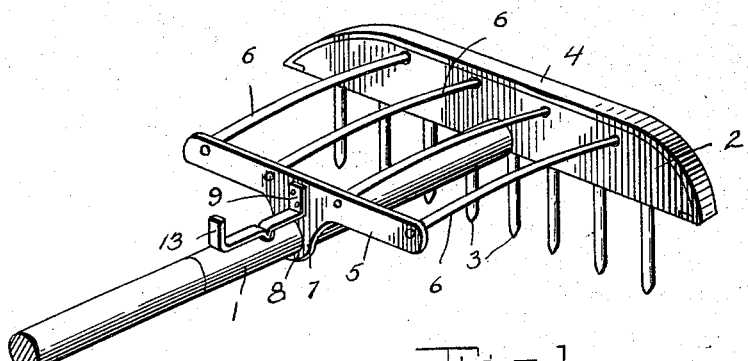
Figure 2:
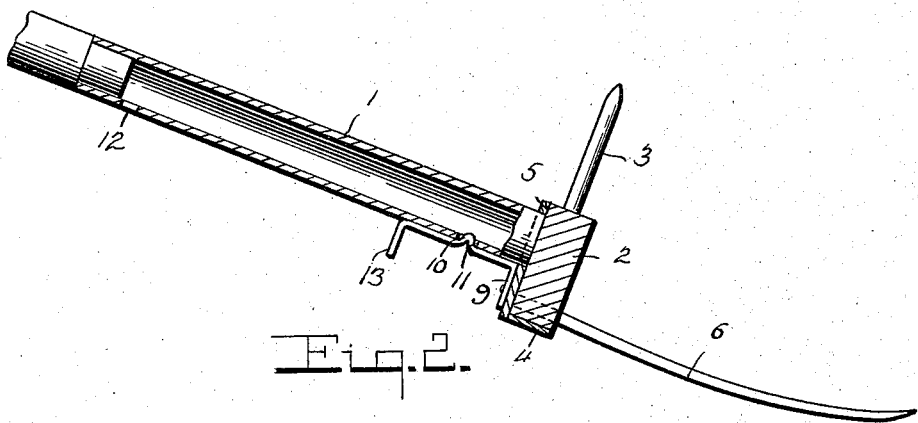

Figure 1 is a perspective view of a combined rake and pitch-fork made in accordance with this invention and showing the pitch-fork withdrawn and the implement in condition to be used as a rake, and Fig. 2 is a sectional view taken through the implement when converted into a pitch-fork.

Referring to the drawing, the numeral 1 designates a tubular shank connected at one end to a rake head 2 provided with rake teeth 3. The rake head 2 is provided with a metal binding strip 4 extending over the top thereof to give greater strength to the head.

Mounted to slide on the tubular shank 1 is a pitch-fork head 5 having a series of tines 6 connected thereto, said tines extending through perforations in the head 2, as shown more clearly in Fig. 1. The head 5 is provided with an extending lug 7 having a perforation 8 through which the tubular member 1 freely slides.

Connected to the head 5 is a spring latch comprising a lug 9 riveted to the head 5 and said latch is provided with an extended bent portion 10 adapted to engage a perforation 11 in the tubular shank 1 when the tines 6 are projected as shown in Fig. 2, while said projection is adapted to engage a perforation 12 in the shank 1 when the tines 6 have been withdrawn from the rake head 2. The latch is provided with a finger hold 13 by means of which the projection 10 may be withdrawn from the perforations 11 and 12.

From the foregoing it will be obvious that the implement can be quickly converted into either a rake or a pitch-fork and that the pitch-fork will be held in two positions by means of the spring latch.

Various changes may be made in the details of construction without departing from the spirit and scope of the invention as defined in the claims.

What is claimed is:—

1. A combined rake and pitch-fork comprising a rake head, said rake head being provided adjacent its upper edge with a plurality of spaced apertures, a tubular shank connected to one face of said head intermediate the ends thereof, a cross bar having an integral depending yoke substantially thereon and provided with a central opening slidably mounted on the tubular shank, a plurality of tines connected to said bar and extending through the openings in the rake head, and a spring latch secured to the rear face of the cross head above the opening in the yoke adapted for holding the cross heads in both an extended and retracted position.

2. A combined rake and pitch fork comprising a tubular shank, a handle in one end of said shank, a rake head secured to the free end of said shank, said rake head being provided with a plurality of teeth on one edge thereof and having a plurality of spaced apertures adjacent its upper edge, a cross bar having formed centrally of its end, a downwardly extending yoke having a central opening therein, for sliding movement on said shank, a plurality of tines secured to one face of the cross head and extending through the openings in the rake head, a spring latch secured to the rear face of the cross head above the opening of the yoke, said latch being substantially U-shaped, an offset central of its web portion to engage depressions in the shank for holding the cross head in an extended or retracted position.

3. A device of the class described comprising a tubular shank, a handle in one end of said shank, a rake head secured to the opposite end of said shank intermediate its ends, said shank provided on its upper face with a plurality of spaced depressions, said rake head having adjacent its upper edge a plurality of relatively spaced apertures, a cross bar having a depending yoke secured on its lower edge intermediate its end, provided on one face with a plurality of tines which are slidably mounted through the openings in the rake head, said yoke being slidably mounted on the tubular shank, a spring latch member substantially U-shaped secured by one of its legs to the rear face of the cross head intermediate the ends thereof, said latch member provided with an offset portion intermediate the ends of the web adapted to engage the depressions in the shank to hold the pitch-fork or cross heads in a retracted or extended position when in use.

In testimony whereof we affix our signatures in presence of two witnesses.

THEODORE MILLER.
CLAYTON A. SEARGENT.

Witnesses:
  WILLIAM S. DEVINE,
  GILBERT F. MILLER.

Copies of this patent may be obtained for five cents each, by addressing the "Commissioner of Patents, Washington, D. C."